United States Patent
Hagiwara et al.

(10) Patent No.: US 11,414,832 B2
(45) Date of Patent: Aug. 16, 2022

(54) WORK VEHICLE

(71) Applicant: KOMATSU LTD., Tokyo (JP)

(72) Inventors: Hirohito Hagiwara, Tokyo (JP); Naoto Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 170 days.

(21) Appl. No.: 16/634,989

(22) PCT Filed: Feb. 18, 2019

(86) PCT No.: PCT/JP2019/005795
§ 371 (c)(1),
(2) Date: Jan. 29, 2020

(87) PCT Pub. No.: WO2019/176453
PCT Pub. Date: Sep. 19, 2019

(65) Prior Publication Data
US 2020/0378087 A1   Dec. 3, 2020

(30) Foreign Application Priority Data

Mar. 14, 2018   (JP) .............................. JP2018-047287

(51) Int. Cl.
*E02F 9/16*   (2006.01)
*E02F 9/20*   (2006.01)
(Continued)

(52) U.S. Cl.
CPC .............. *E02F 9/16* (2013.01); *E02F 9/2004* (2013.01); *B60N 2/753* (2018.02); *B60Y 2200/411* (2013.01); *E02F 9/24* (2013.01)

(58) Field of Classification Search
CPC ... E02F 9/16; E02F 9/2004; E02F 9/24; E02F 3/7636; E02F 9/0841; E02F 9/2012;
(Continued)

(56) References Cited

U.S. PATENT DOCUMENTS 3,223,193 A * 12/1965 Reynolds ........... B62D 49/0685
                                                      180/329
3,369,682 A *  2/1968 Breault ................. B60P 1/6445
                                                      414/559
(Continued)

FOREIGN PATENT DOCUMENTS

CN       203158094 U     8/2013
JP       11-158923 A     6/1999
(Continued)

OTHER PUBLICATIONS

The International Search Report for the corresponding international application No. PCT/JP2019/005795, dated Apr. 2, 2019.
(Continued)

*Primary Examiner* — Paul N Dickson
*Assistant Examiner* — Timothy Wilhelm
(74) *Attorney, Agent, or Firm* — Global IP Counselors, LLP

(57) ABSTRACT

A work vehicle includes a cab, a driver's seat disposed inside the cab, a first steering device, a second steering device, a seating sensor, and a control unit. The first steering device is disposed in front of the driver's seat. The first steering device is configured to perform a steering operation of the vehicle. The second steering device is disposed to a side of the driver's seat. The second steering device is configured to perform a steering operation of the vehicle. The seating sensor detects whether or not an operator is sitting in the driver's seat. The control unit disables the steering operation with the second steering device when the seating sensor detects that the operator is not sitting in the driver's seat.

11 Claims, 5 Drawing Sheets

(51) Int. Cl.
  *B60N 2/75* (2018.01)
  *E02F 9/24* (2006.01)
(58) Field of Classification Search
  CPC ........ B60N 2/753; B60N 2/002; B60N 2/797;
  B60Y 2200/411; B60K 28/04
  See application file for complete search history.

(56) References Cited

U.S. PATENT DOCUMENTS

| | | | | |
|---|---|---|---|---|
| 3,893,728 | A * | 7/1975 | Holopainen | B60N 2/143 297/344.24 |
| 4,012,014 | A * | 3/1977 | Marshall | B64C 13/0421 244/234 |
| 4,026,379 | A * | 5/1977 | Dunn | B60N 2/143 105/342 |
| 4,091,889 | A * | 5/1978 | Brown | B60K 28/00 180/336 |
| 4,478,308 | A * | 10/1984 | Klaassen | E02F 9/2004 180/326 |
| 4,496,190 | A * | 1/1985 | Barley | B60N 2/77 297/411.32 |
| 4,674,798 | A * | 6/1987 | Oeth | B60N 2/77 297/115 |
| 4,702,520 | A * | 10/1987 | Whisler | B60N 2/77 297/115 |
| 4,730,691 | A * | 3/1988 | Grigg | B62D 1/22 180/326 |
| 4,869,337 | A * | 9/1989 | Wagner | E02F 3/964 180/335 |
| 4,895,040 | A * | 1/1990 | Soederberg | G05G 1/52 180/315 |
| 4,934,462 | A * | 6/1990 | Tatara | E02F 9/2012 37/348 |
| 5,052,512 | A * | 10/1991 | Pakosh | B62D 1/22 180/326 |
| 5,086,869 | A * | 2/1992 | Newbery | B62D 1/22 180/329 |
| 5,092,408 | A * | 3/1992 | Tatara | F15B 21/08 37/348 |
| 5,120,187 | A * | 6/1992 | Weber | G05G 11/00 180/324 |
| 5,379,663 | A * | 1/1995 | Hara | G05G 9/04 345/161 |
| 5,542,493 | A * | 8/1996 | Jacobson | G01B 7/003 180/272 |
| 5,566,778 | A * | 10/1996 | Valier | B60N 2/767 180/336 |
| 5,678,469 | A * | 10/1997 | Lech | F16H 61/40 903/902 |
| 5,860,488 | A * | 1/1999 | Kim | B60N 2/797 192/220.3 |
| 6,202,501 | B1 * | 3/2001 | Ikari | B62D 1/12 180/332 |
| 6,226,902 | B1 * | 5/2001 | Heyne | E02F 9/2004 37/348 |
| 6,283,504 | B1 * | 9/2001 | Stanley | B60R 21/01532 297/217.2 |
| 6,540,300 | B2 * | 4/2003 | Piretti | A47C 1/03 297/411.36 |
| 6,577,909 | B1 * | 6/2003 | McGowan | G05B 9/02 700/79 |
| 6,585,073 | B2 * | 7/2003 | Lorenz | B60R 21/09 180/335 |
| 6,634,453 | B2 * | 10/2003 | Arthur | G05G 1/62 180/315 |
| 6,643,577 | B1 * | 11/2003 | Padgett | E02F 9/2012 318/568.18 |
| 6,851,495 | B2 * | 2/2005 | Sprinkle | F16H 61/47 180/338 |
| 6,971,194 | B2 * | 12/2005 | McClelland | E02F 9/2004 180/326 |
| 6,971,471 | B2 * | 12/2005 | Baker | B60T 1/065 296/190.04 |
| 7,032,703 | B2 * | 4/2006 | Wulfert | B60R 11/0235 297/344.13 |
| 7,036,248 | B2 * | 5/2006 | Meyeres | E02F 9/2025 37/234 |
| 7,059,680 | B2 * | 6/2006 | Billger | B60N 2/919 297/344.21 |
| 7,210,552 | B2 * | 5/2007 | Priepke | B62D 1/10 280/771 |
| 7,283,903 | B2 * | 10/2007 | Merten | E02F 9/166 307/10.6 |
| 7,347,299 | B2 * | 3/2008 | Billger | B66F 9/07545 180/326 |
| 7,438,318 | B2 * | 10/2008 | Sano | B60N 2/753 180/326 |
| 7,438,517 | B2 * | 10/2008 | Tanaka | A01B 63/1013 180/315 |
| 7,458,439 | B2 * | 12/2008 | Catton | B60N 2/767 248/125.8 |
| 7,484,587 | B2 * | 2/2009 | Portscheller | B60N 2/143 180/89.12 |
| 7,520,567 | B2 * | 4/2009 | Billger | B60N 2/797 180/331 |
| 7,681,686 | B1 * | 3/2010 | Klas | B60K 26/00 180/329 |
| 7,712,571 | B2 * | 5/2010 | Proud | B60K 26/02 74/491 |
| 7,721,830 | B2 * | 5/2010 | Dunn | B62D 11/001 180/6.48 |
| 7,721,840 | B2 * | 5/2010 | McCord | B62D 1/12 180/402 |
| 7,757,806 | B2 * | 7/2010 | Bower | B60N 2/06 180/326 |
| 7,784,581 | B1 * | 8/2010 | Klas | G05G 9/047 297/344.21 |
| 7,828,107 | B2 * | 11/2010 | Yoshikawa | F16H 59/02 180/323 |
| 7,878,288 | B2 * | 2/2011 | Kostak | B60N 2/777 180/329 |
| 7,899,597 | B2 * | 3/2011 | Vitale | E02F 9/2095 701/50 |
| 7,954,592 | B2 * | 6/2011 | Miyazaki | E02F 9/2004 180/321 |
| 8,041,485 | B2 * | 10/2011 | Prasetiawan | E02F 9/2004 701/50 |
| 8,052,097 | B2 * | 11/2011 | Rollet | B64C 27/56 244/221 |
| 8,104,566 | B2 * | 1/2012 | Harber | E02F 9/16 180/326 |
| 8,335,618 | B2 * | 12/2012 | Knapp | F02N 11/0803 701/84 |
| 8,763,747 | B2 * | 7/2014 | Jones | E02F 9/2004 180/326 |
| 8,820,700 | B2 * | 9/2014 | Roach | G05G 23/00 248/560 |
| 8,851,225 | B2 * | 10/2014 | Braun | E02F 9/16 180/324 |
| 8,979,175 | B2 * | 3/2015 | Kim | B62D 33/073 296/190.04 |
| 9,217,240 | B2 | 12/2015 | Shibata | E02F 9/26 |
| 9,592,758 | B2 * | 3/2017 | Mahler | B60N 2/797 |
| 9,707,865 | B1 * | 7/2017 | Buerkle | B60N 2/38 |
| 9,777,460 | B2 | 10/2017 | Wuisan | E02F 9/2004 |
| 9,797,113 | B2 * | 10/2017 | Tolkacz | B62D 33/06 |
| 9,797,114 | B2 * | 10/2017 | Maifield | E02F 3/765 |
| 9,840,826 | B2 * | 12/2017 | Huber | B60K 37/06 |
| 9,878,733 | B2 * | 1/2018 | Enomoto | B62D 1/12 |
| 9,885,170 | B2 * | 2/2018 | Katayanagi | H01H 3/022 |
| 10,144,316 | B2 * | 12/2018 | Peterson | B60N 2/42772 |
| 10,196,795 | B2 * | 2/2019 | Kato | G05G 9/047 |
| 10,227,083 | B2 * | 3/2019 | Teranishi | E02F 9/2004 |
| 10,253,477 | B2 * | 4/2019 | Kato | E02F 9/0841 |
| 10,370,821 | B2 * | 8/2019 | Muramoto | B62D 1/18 |
| 10,391,983 | B2 * | 8/2019 | Klein | B60T 7/04 |
| 10,471,923 | B2 * | 11/2019 | Jimenez | B60R 21/213 |

(56) References Cited

U.S. PATENT DOCUMENTS

| | | | | |
|---|---|---|---|---|
| 10,597,851 B2* | 3/2020 | Isaka | ............... | E02F 9/16 |
| 10,702,069 B2* | 7/2020 | Pelka | ............... | B60N 2/24 |
| 10,794,043 B2* | 10/2020 | Takenaka | ............... | B62D 5/24 |
| 10,814,746 B2* | 10/2020 | Sailer | ............... | B62D 63/04 |
| 10,820,473 B2* | 11/2020 | Salzman | ............... | A01B 76/00 |
| 10,994,778 B2* | 5/2021 | Benck | ............... | E02F 9/225 |
| 2002/0145325 A1* | 10/2002 | Clevenger | ............... | G05G 1/62 |
| | | | | 297/411.32 |
| 2003/0184123 A1* | 10/2003 | Amamiya | ............... | B60N 2/797 |
| | | | | 296/190.01 |
| 2006/0000656 A1* | 1/2006 | Bisick | ............... | B60N 2/797 |
| | | | | 180/272 |
| 2006/0232116 A1* | 10/2006 | Jang | ............... | E02F 9/24 |
| | | | | 297/354.1 |
| 2007/0203630 A1 | 8/2007 | Vitale et al. | | |
| 2008/0277190 A1* | 11/2008 | McCord | ............... | B62D 1/22 |
| | | | | 180/443 |
| 2009/0223092 A1 | 9/2009 | Harber et al. | | |
| 2015/0360593 A1* | 12/2015 | Mahler | ............... | B60N 2/777 |
| | | | | 297/411.32 |
| 2018/0230675 A1* | 8/2018 | Kato | ............... | B60N 2/797 |
| 2020/0378085 A1 | 12/2020 | Ono | | |
| 2021/0261205 A1* | 8/2021 | McConoughey | .. | B62D 33/0617 |
| 2021/0261206 A1* | 8/2021 | McConoughey | .... | B62D 33/073 |

FOREIGN PATENT DOCUMENTS

| | | |
|---|---|---|
| JP | 2009-527672 A | 7/2009 |
| JP | 2017-172184 A | 9/2017 |
| WO | 2017/163822 A1 | 9/2017 |

OTHER PUBLICATIONS

The Office Action for the corresponding Chinese application No. 201980003972.7, dated Nov. 26, 2020.

* cited by examiner

WORK VEHICLE

CROSS-REFERENCE TO RELATED APPLICATIONS

This application is a U.S. National stage application of International Application No. PCT/JP2019/005795, filed on Feb. 18, 2019. This U.S. National stage application claims priority under 35 U.S.C. § 119(a) to Japanese Patent Application No. 2018-047287, filed in Japan on Mar. 14, 2019, the entire contents of which are hereby incorporated herein by reference.

BACKGROUND

Field of the Invention

The present invention relates to a work vehicle.

Background Information

In general, a work vehicle such as a motor grader or a wheel loader is provided with a steering wheel for performing a steering operation of the vehicle and a steering mechanism for steering steered wheels in conjunction with the operation of the steering (see Japanese Laid-Open Patent Publication No. 1111-158923). The steering wheel is disposed in front of a driver's seat inside a cabin. The method for steering the steered wheels involves causing the vehicle body frame to bend as well as changing the orientation or inclination of the wheels.

SUMMARY

In the abovementioned work vehicle, the operator may perform the steering operation of the vehicle with a steering lever (referred to below as a "second steering device") disposed near the driver's seat instead of the steering wheel (referred to below as a "first steering device") disposed in front of the driver's seat. For example, when a work implement lever for operating a work implement is disposed to the side of the driver's seat, the steering operation can be performed on the vehicle with the second steering device disposed to the side of the driver's seat while operating the work implement with the work implement lever, whereby work efficiency can be improved. The use or non-use of the second steering device provided inside the cabin can be selected with an operating switch.

However, it is very troublesome for the operator to select the use or non-use of the second steering device with the operating switch.

In consideration of the above problem, an object of the present invention is to provide a work vehicle with which the usability of the second steering device is facilitated.

A work vehicle according to the present invention has a cab, a driver's seat, a first steering device, a second steering device, a seating sensor, and a control unit. The driver's seat is disposed inside the cabin. The first steering device is disposed in front of the driver's seat and is configured to perform a steering operation of the vehicle. The second steering device is disposed to the side of the driver's seat and configured to perform a steering operation of the vehicle. The seating sensor is configured to detect whether or not an operator is sitting in the driver's seat. The control unit is configured to disable the steering operation performed with the second steering device when the seating sensor detects that the operator is not sitting in the driver's seat.

According to the present invention, a work vehicle can be provided with which the usability of the second steering device is facilitated.

DETAILED DESCRIPTIONS OF EMBODIMENT(S)

A case of first and second steering devices according to the present invention applied to a motor grader will be explained as an example of a work vehicle with reference to the drawings. However, the scope of the present invention is not limited to the following embodiment and may be changed as desired within the scope of the technical concept of the present invention. For example, the first and second steering devices according to the present invention may be applied to a work vehicle that can travel with steered wheels without being limited to a motor grader. A wheel loader or the like can be cited as such a type of work vehicle in addition to a motor grader. Methods for steering the steered wheels include bending the vehicle body frame in addition to changing the orientation or inclination of the wheels.

In the present description, "front" is a term that indicates the forward direction of the work vehicle, and "rear" indicates the reverse direction of the work vehicle. In addition, "left" and "right" are terms relative to the traveling direction when the work vehicle is traveling forward. "Up" and "down" are terms relative to the vertical direction.

(Motor Grader 1)

Figure 1:
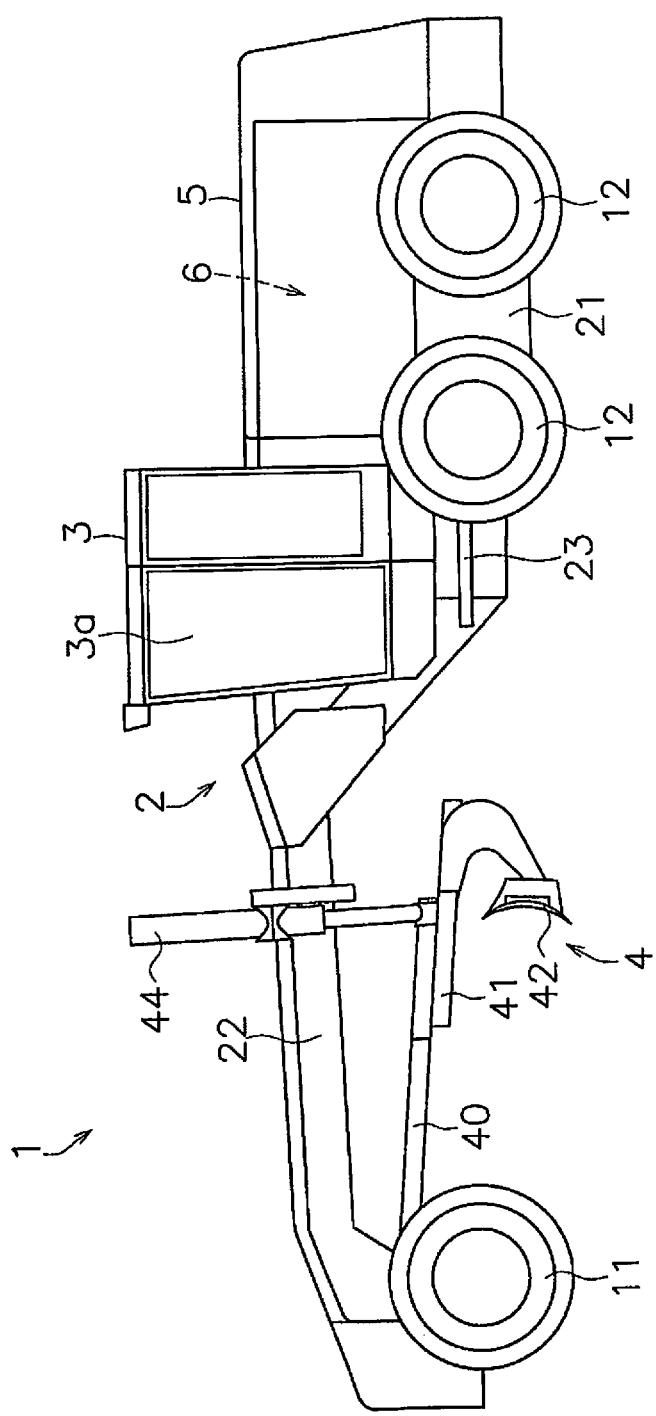
FIG. 1 is a side view illustrating a configuration of a motor grader according to the present embodiment.

FIG. 1 is a side view illustrating a configuration of a motor grader 1 according to the present embodiment.

The motor grader 1 is provided with traveling wheels 11, 12, a vehicle body frame 2, a cab (operating cabin) 3, a work implement 4, and an exterior cover 5.

The traveling wheels 11, 12 have front wheels 11 and rear wheels 12. The front wheels 11 are steered wheels which are steered by a steering cylinder which is not illustrated in the drawing. One front wheel 11 is provided on each of the left and right sides. The rear wheels 12 are drive wheels which are driven by an engine 6 contained inside the exterior cover 5. The rear wheels 12 are provided as two wheels on each of the right and left sides. In FIG. 1, only the one left side front wheel 11 and the two left side rear wheels 12 are illustrated. However, the number and disposition of the front wheels 11 and the rear wheels 12 may be changed as appropriate.

The vehicle body frame 2 extends in the front-back direction. The vehicle body frame 2 has a rear frame 21, a front frame 22, and an articulating cylinder 23. The rear frame 21 supports the engine 6 and the exterior cover 5. The rear wheels 12 are attached to the rear frame 21. The front frame 22 is disposed in front of the rear frame 21. The front frame 22 is coupled to the rear frame 21 via the articulating cylinder 23. The front frame 22 is able to rotate to the left and right with respect to the rear frame 21 due to the extension and contraction of the articulating cylinder 23. The front wheels 11 are attached to the front frame 22.

The cab 3 is supported by a front end part of the rear frame 21 or by a rear end part of the front frame 22. The cab 3 has a pair of right and left doors 3a, 3a. Only the left door 3a is illustrated in FIG. 1. The operator is able to enter and exit the cab 3 by opening the doors 3a. An internal structure of the cab 3 is explained below. Each door 3a has a frame on the edges and the entire door 3a is a transparent glass window whereby the exterior is visible.

The work implement 4 includes a drawbar 40, a turning circle 41, a blade 42, and a lift cylinder 44. The drawbar 40 is disposed below the front frame 22. A front end part of the drawbar 40 is coupled, via a ball bearing which is not illustrated, to the front end part of the front frame 22 in a manner that allows pivoting to the left and right. A rear end part of the drawbar 40 is supported by the lift cylinder 44. The rear end part of the drawbar 40 is able to pivot to the up and down due to the extension and contraction of the lift cylinder 44. The turning circle 41 is disposed below the rear end part of the drawbar 40. The turning circle 41 is able to turn clockwise and anticlockwise when viewed from above the vehicle.

The blade 42 is disposed between the front wheels 11 and the rear wheels 12. The blade 42 is supported by the turning circle 41. The inclination angle of the blade 42 with respect to the front-back direction can be adjusted by turning the turning circle 41.

(Internal Structure of Cab 3)

Figure 2:
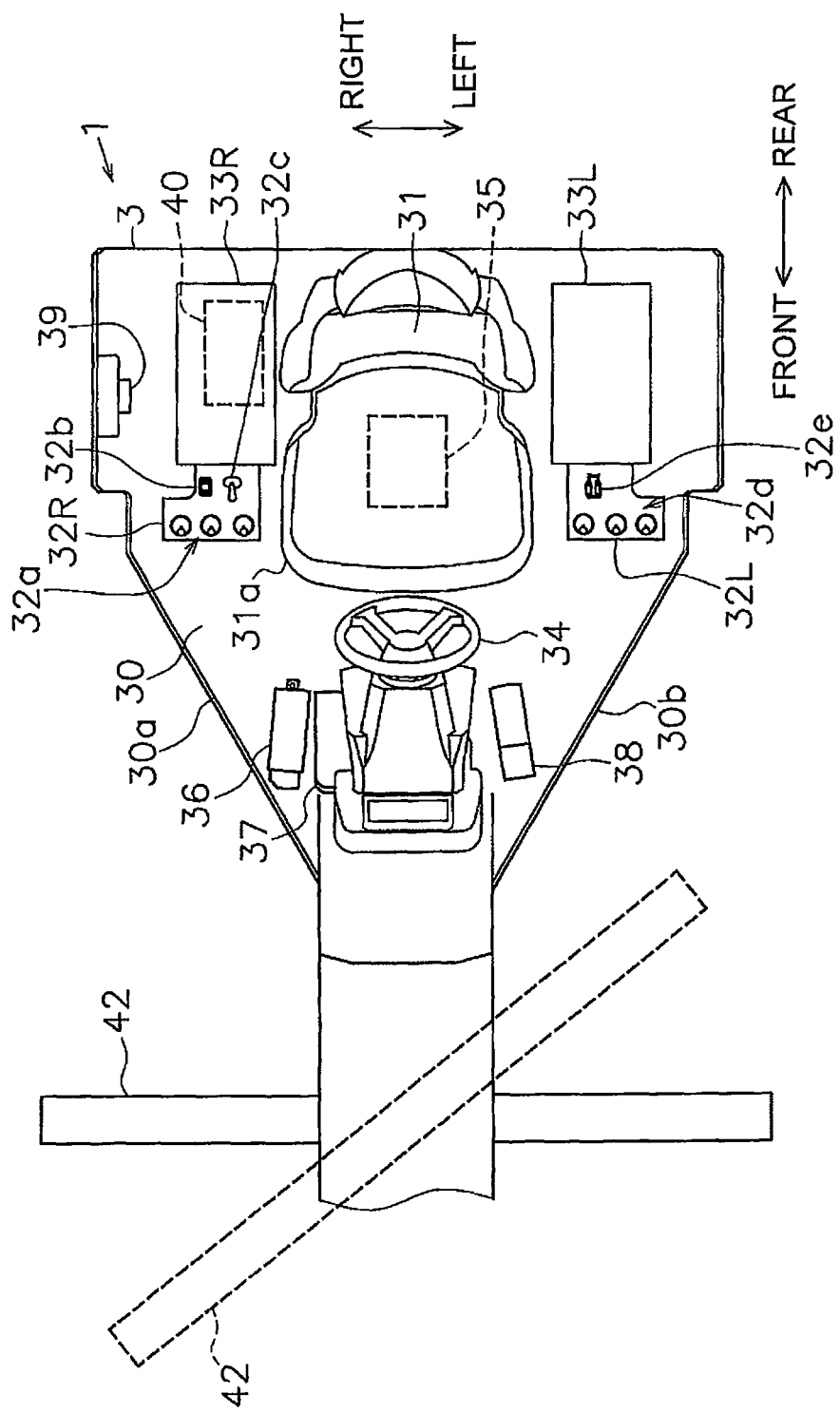
FIG. 2 is a top view an internal structure of a cab according to the present embodiment.
Figure 3:
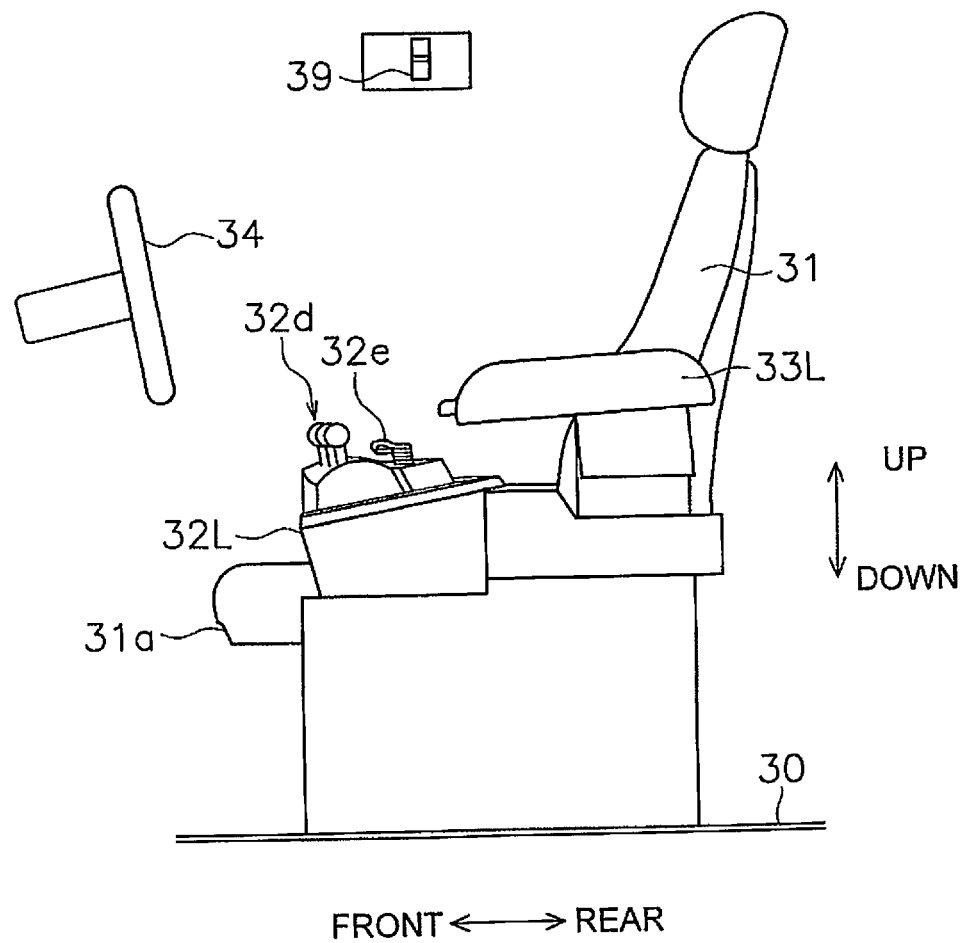
FIG. 3 is a left side view of the internal structure of the cab according to the present embodiment.

FIG. 2 is a top view the internal structure of the cab 3. FIG. 3 is a left side view illustrating the internal structure of the cab 3.

The cab 3 is provided therein with a floor 30, an driver's seat 31, a right side console 32R, a left side console 32L, a right side armrest 33R, a left side armrest 33L, a steering wheel 34 (an example of a "first steering device"), a seating sensor 35, an accelerator pedal 36, a brake pedal 37, an inching pedal 38, a steering lever switch 39, and a control unit 40.

The floor 30 is configured by a hexagonal plate member. The floor 30 is formed in a tapered shape that is tapered toward the front when viewed from above. Specifically, a right side cut part 30a is formed on the right side of a front end part of the floor 30, and a left side cut part 30b is formed on the left side of the front end part of the floor 30. In this way, the floor 30 is formed in a tapered shape that is tapered toward the front whereby the field of view downward and toward the front of the floor 30 can be made wider and the operator is able to accurately see the leveling work state by the blade 42 while sitting in the driver's seat 31.

The driver's seat 31 is disposed on the floor 30. The driver's seat 31 is a seat for the operator to sit in. The operator sits in the driver's seat 31 and operates the motor grader 1 while facing forward. The seating sensor is disposed inside a seat part 31a of the driver's seat 31. The seating sensor 35 detects whether or not the operator is sitting in the driver's seat 31. The seating sensor 35 outputs the detection results to the control unit 40.

The right side console 32R is disposed on the right side of the driver's seat 31. An upper part of the right side console 32R has provided thereon a right side work implement lever group 32a, a travel lever 32b, a speed change lever 32c, and the right side armrest 33R and the like. The right side work implement lever group 32a includes operating tools for operating the work implement 4. In the present embodiment, three work implement levers are included in the right side work implement lever group 32a. The three work implement levers are configured in a manner that allows pivoting forward and backward around a base end part of each lever. The travel lever 32b is an operating tool for switching between forward travel, reverse travel, and stopping of the vehicle. The travel lever 32b can be moved between a forward travel position, a reverse travel position, and a neutral position. The travel lever 32b is disposed to the rear of the right side work implement lever group 32a. The speed change lever 32c is an operating tool for changing the speed of the vehicle. The speed change lever 32c is configured in a manner, for example, that allows switching between velocity stages from a first velocity stage up to an eighth velocity stage. The speed change lever 32c is disposed to the left of the travel lever 32b. However, the number, the dispositions, and the operating directions of each of the levers on the right side console 32R may be changed as appropriate. The right side armrest 33R is an elbow rest for the right arm. The right side armrest 33R is disposed to the rear of the various levers on the right side console 32R.

The left side console 32L is disposed to the left of the driver's seat 31. The left side console 32L has provided thereon a left side work implement lever group 32d (example of a "work implement operating tool"), a steering lever 32e (example of a "second steering device"), and the left side armrest 33L, etc. The left side work implement lever group 32d is an operating tool for operating the work implement 4. In the present embodiment, the left side work implement lever group 32d includes three work implement levers. The three work implement levers are configured in a manner that allows pivoting forward and backward around a base end part of each lever. The steering lever 32e includes a switch type lever that can be operated with a finger in addition to a joystick lever which is operated with a hand.

The steering lever 32e is an operating tool for performing a steering operation of the vehicle. The steering lever 32e is disposed to the side (specifically, to the left side) of the driver's seat 31. The steering lever 32e is disposed to the rear of the left side work implement lever group 32d. The steering lever 32e is disposed between the left side work implement lever group 32d and the left side armrest 33L in the front-back direction.

The steering lever 32e is, for example, a switch type lever for a steering operation. The steering lever 32e is configured in a manner that allows pivoting to the left and right around a base end part. Specifically, the steering lever 32e is positioned in a neutral position in the center while the operator is not steering, and is tilted toward the right or left from the neutral position in response to an operation by the operator. For example, the operator is able to operate the left side work implement lever group 32d forward and backward with the index finger of the left hand and further operate the right side work implement lever group 32a forward and backward with the index finger of the right hand while operating the steering lever 32e leftward and rightward with the thumb of the left hand. In this way, the steering lever 32e can be used to drive and operate the work implement 4 while performing a steering operation of the vehicle, and is useful for so-called combined operations. The steering lever 32e may also be a joystick lever that can be operated with the wrist of the left hand.

However, the number, the dispositions, and the operating directions of the levers on the left side console 32L can be changed as appropriate. The left side armrest 33L is an elbow rest for the left arm. The left side armrest 33L is disposed to the rear of the steering lever 32e.

The steering wheel 34 is disposed in front of the driver's seat 31. The steering wheel 34 is a steering tool for performing a steering operation of the vehicle. The steering wheel 34 is configured so as to allow rotating to the left and right as seen from the operator sitting in the driver's seat 31. Because the steering lever 32e is mainly used in the aforementioned combined operations, the steering wheel 34 is mainly used when performing a steering operation of the vehicle without operating the work implement 4.

The accelerator pedal 36 is an operating tool that is pressed with a foot of the operator for setting the engine rotation speed to a desired rotation speed. The brake pedal 37 is an operating tool that is pressed with a foot of the operator for braking the rear wheels 12. The inching pedal 38 is an operating tool that is pressed with a foot of the operator for reducing the vehicle speed by causing a slip in a clutch. The accelerator pedal 36 and the brake pedal 37 are disposed to the right of the steering wheel 34 and the inching pedal 38 is disposed to the left of the steering wheel 34 when viewed from above the vehicle.

The steering lever switch 39 is disposed to the right and upward from the driver's seat 31. The steering lever switch 39 is attached to an inside wall of the cab 3. The steering lever switch 39 is an operating tool for switching the steering lever 32e between operating (ON) and non-operating (OFF). The steering lever switch 39 is configured so as to allow switching between an operating position (ON position) and a non-operating position (OFF position). When the below mentioned conditions are satisfied while the steering lever switch 39 is in the operating position, the steering operation with the steering lever 32e is disabled. The steering operation with the steering lever 32e is completely disabled when the steering lever switch 39 is in the non-operating position.

The control unit 40 is contained inside the right side console 32R. The control unit 40 is connected to each of the operating tools inside the cab 3 and controls the vehicle in response to the operating states of each of the operating tools.

(Configuration of Control Unit 40)

Figure 4:
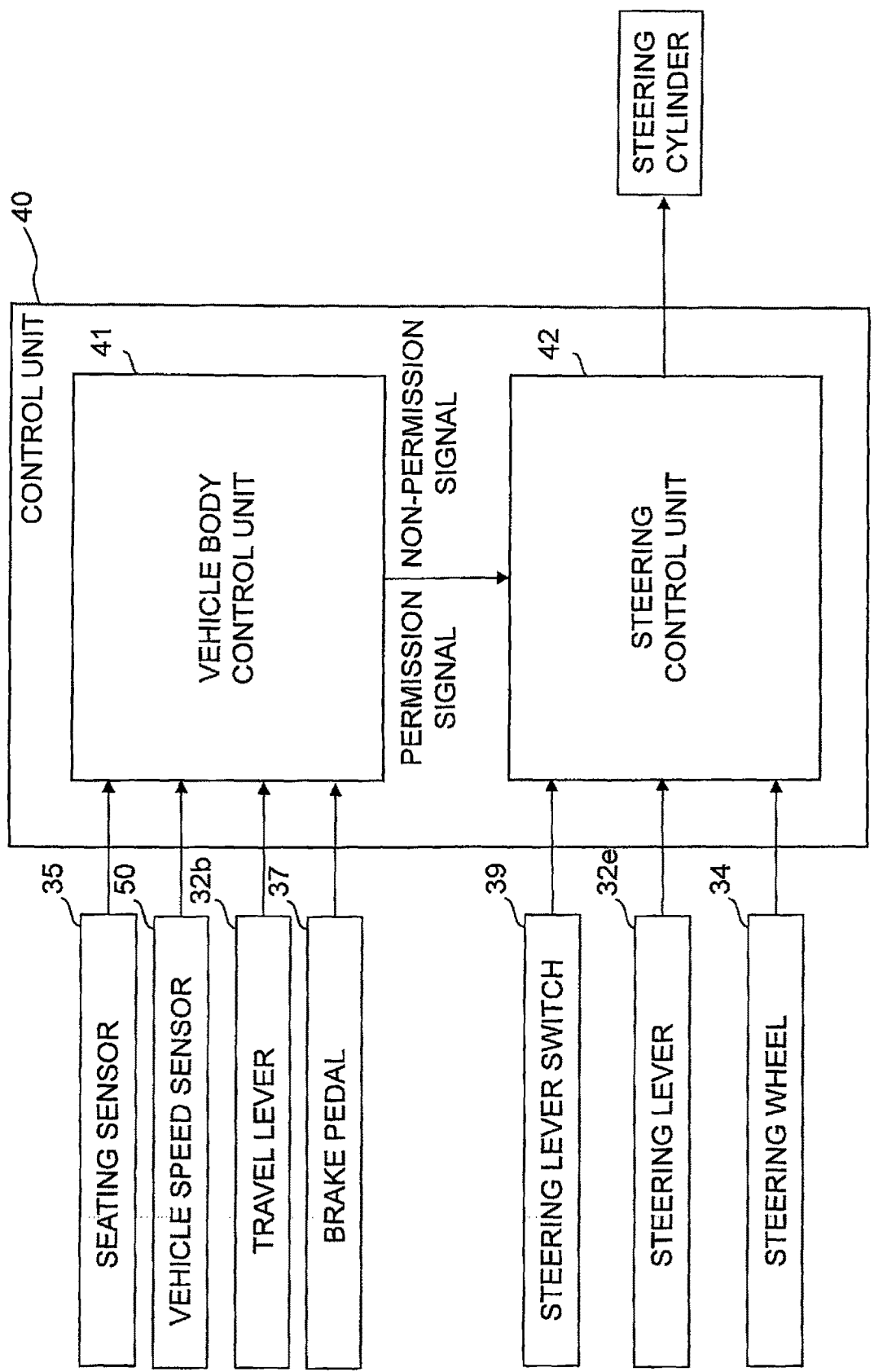
FIG. 4 is a block diagram illustrating a configuration of a control unit according to the present embodiment.

FIG. 4 is a block diagram illustrating a configuration of the control unit 40. The control unit 40 has a vehicle body control unit 41 and a steering control unit 42.

The vehicle body control unit 41 is connected to the seating sensor 35, a vehicle speed sensor 50, the travel lever 32b, and the brake pedal 37. The vehicle body control unit 41 determines whether or not the following four conditions are established.

Condition 1: the operator is not sitting in the driver's seat 31.

Condition 2: The vehicle speed is a predetermined speed or less.

Condition 3: The travel lever 32b is in the neutral position.

Condition 4: The brake pedal 37 is not being pressed.

When all of the conditions 1-4 are established, the vehicle body control unit 41 outputs, to the steering control unit 42, a non-permission signal which indicates that steering operations by the steering lever 32e should not be permitted.

Specifically, if condition 1 is established, it may be determined that the operator is not able to perform a steering operation and no steering operation with the steering lever 32e may be permitted. However, in the present embodiment, conditions 2-4 are added to condition 1. Condition 2 and condition 3 are conditions provided in consideration in the event it is determined that the operator is temporarily not sitting due to bouncing and the like of the vehicle irrespective of whether the operator is sitting or not. Specifically, condition 2 is a condition provided in consideration of the event that a steering operation performed with the steering lever 32e is required if the vehicle speed is relatively high. Condition 3 is a condition provided in consideration of the event that there is an intent to perform a steering operation by the operator if the travel lever 32b is in the forward travel position or the reverse travel position. Condition 4 is a condition provided in consideration of the event that the operator wants to check the operation of the front wheels 11 with the steering lever 32e while standing up from the driver's seat 31.

When at least one of the conditions 1-4 is not established, the vehicle body control unit 41 outputs, to the steering control unit 42, a permission signal which indicates that the steering operation with the steering lever 32e should be permitted.

The steering control unit 42 is connected to the steering lever switch 39,0

Condition A: a permission signal is inputted from the vehicle body control unit 41

Condition B: the steering lever switch 39 is in the operating position.

Condition C: the steering lever 32e is in the neutral position.

The steering control unit 42 permits a steering operation with the steering lever 32e when all of the conditions A-C are established. Specifically, the steering control unit 42 allows the steering cylinder to be actuated for steering the front wheels 11 in response to the operating direction and the operating amount of the steering lever 32e when all three of the above conditions are established.

Basically, while it may be not necessary to lock (deactivate) the steering operation with the steering lever 32e if condition A is established, in the present embodiment conditions B and C are added to condition A. Condition B is a condition provided in consideration of the event that the operator originally does not want to perform a steering operation with the steering lever 32e even though there is a situation that would allow a steering operation to be performed with the steering lever 32e. Condition C is a condition provided in consideration of the possibility that there is no intention to perform a steering operation while the steering lever 32e is being operated even though there is a situation that would allow a steering operation to be performed with the steering lever 32e.

The steering control unit 42 disables the steering operation with the steering lever 32e when at least one condition of the conditions A-C is established. Specifically, the steering control unit 42 does not allow the steering cylinder to be driven even if the steering lever 32e is operated when at least one condition of the conditions A-C is established.

Conversely, the steering control unit 42 causes the steering cylinder to be driven in response to the rotation direction and rotation amount of the steering wheel 34 regardless of whether any of the conditions A-C are established.

(Operation of Control Unit 40)

Figure 5:
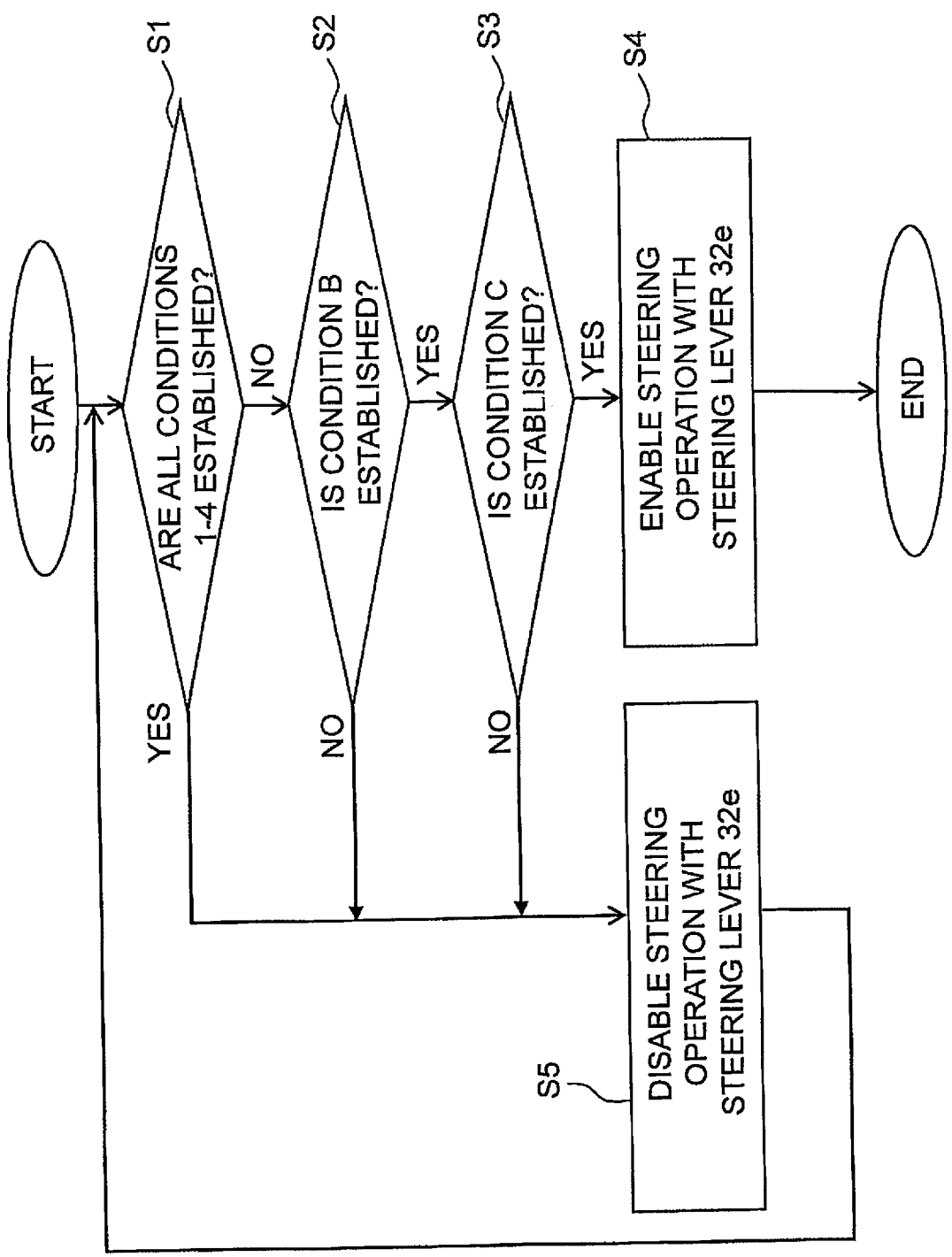
FIG. 5 is a flow chart for explaining steering operation usability control of the steering lever according to the present embodiment.

The steering operation usability control of the steering lever 32e by the control unit 40 will be explained with reference to FIG. 5. FIG. 5 is a flow chart for explaining the steering usability permission control of the steering lever 32e. The flow chart depicts the steering operation usability of the steering lever 32e when the vehicle body is beginning to move. Accordingly, the timing when the steering operation of the steering lever 32e is permitted is depicted as the "END" in the processing.

In step S1, the vehicle body control unit 41 determines whether or not all of the aforementioned conditions 1-4 are established. Specifically, the vehicle body control unit 41 determines whether or not the operator is sitting in the driver's seat 31 (condition 1), whether or not the vehicle speed is the predetermined speed or less (condition 2), whether or not the travel lever 32b is in the neutral position (condition 3), and whether or not the brake pedal 37 is being pressed (condition 4). When all of the conditions 1-4 are established, the non-permission signal is inputted by the vehicle body control unit 41 to the steering control unit 42, and the processing advances to step S5. When at least one of the conditions 1-4 is not established, a permission signal is inputted from the vehicle body control unit 41 to the steering control unit 42 and the processing advances to step S2.

In step S2, the steering control unit 42 determines whether or not the aforementioned condition B is established. Specifically, the steering control unit 42 determines whether or not the steering lever switch 39 is in the operating position. When the steering lever switch 39 is in the operating position, the processing advances to step S3. When the steering lever switch 39 is in the non-operating position, the processing advances to step S5.

In step S3, the steering control unit 42 determines whether the aforementioned condition C is established. Specifically, the steering control unit 42 determines whether or not the steering lever 32e is in the neutral position. When the steering lever 32e is in the neutral position, the processing advances to step S4. When the steering lever 32e is not in the neutral position, the processing advances to step S5.

In step S4, the steering control unit 42 allows the steering operation with the steering lever 32e. That is, the steering control unit 42 enables the steering operation with the steering lever 32e without any limitation.

In step S5, the steering control unit 42 disables the steering operation with the steering lever 32e. That is, the steering control unit 42 limits and deactivates the steering operation with the steering lever 32e. The processing then returns to step S1 and the steering operation usability control of the steering lever 32e is repeated.

(Characteristics)

(1) The motor grader 1 is provided with the driver's seat 31, the steering wheel 34 (example of the "first steering device"), the steering lever 32e (example of the "second steering device"), the seating sensor 35, and the control unit 40 disposed inside the cab 3. The steering wheel 34 is disposed in front of the driver's seat 31. The steering lever 32e is disposed to the side of the driver's seat 31. The control unit 40 disables the steering operation with the steering lever 32e when the event that the operator is not sitting in the driver's seat 31 is detected by the seating sensor 35. Therefore, the operator does not need to perform an unnecessary operation when getting in or out of the vehicle even when the steering lever 32e is provided separately from the steering wheel 34.

(2) The motor grader 1 is provided with the left side armrest 33L disposed to the rear of the steering lever 32e. Although an unintended operation of the steering lever 32e by the operator may occur more easily in this case, an unintentional operation is effectively restricted even if one occurs.

(3) The steering lever 32e is disposed to the rear of the left side work implement lever group 32d (example of the "work implement operating tool"). Therefore, the operation of the work implement 4 with the left side work implement lever group 32d can be performed while performing a steering operation of the vehicle with the steering lever 32, that is, a so-called combined operation.

(4) The floor 30 of the cab 3 has a tapered shape that is tapered toward the front when viewed from above, and the work implement 4 can be seen by the operator while sitting in the driver's seat. Specifically, as illustrated in FIG. 2, the blade 42 can be seen from the area where the floor 30 of the cab 3 is formed in the tapered shape. For example, a lock bar may be attached to the front part of the left side console 32L in a manner that allows rotation up and down, and if the enabling and disabling of the steering operation of the steering lever 32e is controlled in response to the up and down movement of the lock bar, the visibility of the work implement 4 that was improved with great effort would be impaired. Therefore, the method for controlling the enabling and disabling of the steering operation of the steering lever 32e on the basis of the detection result of the seating sensor 35 is especially useful when improving the visibility of the work implement 4 by forming the floor 30 in a tapered shape.

Other Embodiments

While the above embodiment is explained in the case of the first steering device and the second steering device according to the present invention being applied to a motor grader, the first steering device and the second steering device according to the present invention can be applied widely to a work vehicle (for example, a wheel loader or the like) that can travel with steered wheels.

In the above embodiment, while the vehicle body control unit 41 outputs the non-permission signal to the steering control unit 42 when all of the conditions 1-4 are established, the present invention is not limited in this way. The vehicle body control unit 41 may also output the non-permission signal when one to three conditions including at least condition 1 is established.

In the above embodiment, while the vehicle body control unit 41 determines whether or not "the brake pedal 37 is not being pressed" is established as the condition 4, the vehicle body control unit 41 may determine that "the inching pedal 38 is not being pressed" as the condition 4 instead.

In the above embodiment, while the vehicle body control unit 41 enables the steering operation with the steering lever 32e when all of the three conditions A-C are established, the present invention is not limited in this way. The vehicle body control unit 41 may enable the steering operation with the steering lever 32e when one to two of the conditions including at least condition A is established. The motor grader 1 may not be provided with the steering lever switch 39 according to condition B.

In the above embodiment, while the steering lever 32e is disposed to the left side of the driver's seat 31, the steering lever 32e may be disposed to the right side of the driver's seat 31. In addition, the steering lever 32e may be moved to a position shifted to the front or back or to the left or right from the position illustrated in FIG. 2.

What is claimed is:
1. A work vehicle comprising:
a cab;
a driver's seat disposed inside the cab;
a first steering device disposed in front of the driver's seat, the first steering device being configured to perform a steering operation of the vehicle while an operator is sitting in the driver's seat and facing forward;
a second steering device disposed to a side of the driver's seat, the second steering device being configured to perform a steering operation of the vehicle while the operator is sitting in the driver's seat and facing forward;
a seating sensor configured to detect whether or not an operator is sitting in the driver's seat; and a control unit configured to disable the steering operation with the second steering device when the seating sensor detects that the operator is not sitting in the driver's seat, the control unit being further configured not to disable the steering operation with the first steering device.

2. The work vehicle according to claim 1, further comprising:
an armrest disposed to a rear of the second steering device.

3. The work vehicle according to claim 1, further comprising:
a work implement; and
a work implement operating tool disposed in front of the second steering device,
the second steering device being disposed to a rear of the work implement operating tool.

4. The work vehicle according to claim 3, wherein
the cab has a floor that is formed in a tapered shape toward a front when viewed from above, and
the work implement is disposed in front and below the cab, and the work implement is visible to the operator sitting in the driver's seat.

5. The work vehicle according to claim 1, wherein
the control unit is configured to disable the steering operation with the second steering device when the seating sensor detects that the operator is not sitting in the driver's seat and at least one other condition is satisfied.

6. The work vehicle according to claim 5, wherein
the at least one other condition includes a traveling speed of the work vehicle being equal to or slower than a prescribed speed.

7. The work vehicle according to claim 5, wherein
the at least one other condition includes a travel lever of the work vehicle being in a neutral position.

8. The work vehicle according to claim 5, wherein
the at least one other condition includes a brake pedal of the work vehicle not being pressed.

9. The work vehicle according to claim 5, wherein
the at least one other condition includes:
a traveling speed of the work vehicle being equal to or slower than a prescribed speed;
a travel lever of the work vehicle being in a neutral position; and
a brake pedal of the work vehicle not being pressed.

10. A work vehicle comprising:
a cab;
a driver's seat disposed inside the cab;
a first steering device disposed in front of the driver's seat, the first steering device being configured to perform a steering operation of the vehicle while an operator is sitting in the driver's seat and facing forward;
a second steering device disposed to a side of the driver's seat, the second steering device being configured to perform a steering operation of the vehicle while the operator is sitting in the driver's seat and facing forward;
a seating sensor configured to detect whether or not an operator is sitting in the driver's seat; and
a control unit configured to disable the steering operation with the second steering device when the seating sensor detects that the operator is not sitting in the driver's seat and at least one other condition is satisfied,
the at least one other condition including a switch of the second steering device being in a non-operating position.

11. A work vehicle comprising:
a cab;
a driver's seat disposed inside the cab;
a first steering device disposed in front of the driver's seat, the first steering device being configured to perform a steering operation of the vehicle while an operator is sitting in the driver's seat and facing forward;
a second steering device disposed to a side of the driver's seat, the second steering device being configured to perform a steering operation of the vehicle while the operator is sitting in the driver's seat and facing forward;
a seating sensor configured to detect whether or not an operator is sitting in the driver's seat; and
a control unit configured to disable the steering operation with the second steering device when the seating sensor detects that the operator is not sitting in the driver's seat and at least one other condition is satisfied,
the at least one other condition including the second steering device not being in a neutral position.

* * * * *